United States Patent Office 3,428,416
Patented Feb. 18, 1969

3,428,416
METHOD OF MANUFACTURING FERRITES
Ong Tjing Gie, Gerben Sjoerd Krijtenburg, and Berend Jan Nijhof, Emmasingel, Eindhoven, Netherlands, assignors to North American Philips Company, Inc., New York, N.Y., a corporation of Delaware
No Drawing. Continuation of application Ser. No. 392,616, Aug. 27, 1964. This application Nov. 6, 1967, Ser. No. 681,036
Claims priority, application Netherlands, Aug. 9, 1963, 296,505; Apr. 11, 1964, 6403954
U.S. Cl. 23—51                                                 7 Claims
Int. Cl. C01g 49/02; H01f 1/11

---

ABSTRACT OF THE DISCLOSURE

A method of preparing a ferrite ($MFe_2O_4$, in which M may be one or more bivalent metals) in which ferrous sulfate heptahydrate is mixed with a metal compound such as a metal oxide or carbonate which can react with $Fe_2O_3$ to form the ferrite and stirred at a temperature 30°–80° C. to form granules which are then heated at a temperature of about 250° C. to dry the granules and remove the water therefrom. The granules are then transferred to a fluid bed furnace where a solid state reaction produces the ferrite.

---

This application is a continuation of application Ser. No. 392,616, Aug. 27, 1964.

Our invention relates to a process of manufacturing ferrites and in particular to a method of preparing a ferrite-forming mixture from relatively inexpensive, abundant raw materials.

As employed in this specification and claims, a "ferrite" is defined as the reaction product of ferric oxide and one or more metal oxides including ferrous oxide.

Ferrites are generally divided into two classes on the basis of their magnetic properties, i.e. "soft" ferromagnetic ferrites and "hard" ferromagnetic ferrites. The "soft" ferrites generally have a low coercive force, e.g. less than 10 oersteds so that when a magnetizing field is applied, they magnetize easily and when the magnetizing field is removed, they readily demagnetize. "Hard" ferrites generally have a large coercive force and retain their magnetism after the field is removed.

The "soft" ferrites generally have a composition corresponding to the formula $M^{II}O \cdot Fe_2O_3$ in which M may be one or more of the metals Ni, Mg, Cu, Mn, Zn, and $Fe^{II}$. These ferrites may be composed of single crystals, e.g. NiO, $Fe_2O_3$, $MnO \cdot Fe_2O_3$ or mixed crystals, e.g. $(Mn, Zn)O \cdot Fe_2O$, $(Ni,Zn)O \cdot Fe_2O_3$.

The "hard" ferrites generally have a hexagonal crystal structure and a composition corresponding to $MO \cdot 6Fe_2O_3$ in which M is at least one of the metals Ba, Sr, or Pb.

A common constituent of all these ferrites is ferric oxide ($Fe_2O_3$). These ferrites are all prepared by heating a finely-divided mixture of the metal oxides above 500° C., preferably above 700° C. to prefire the oxide mixture, cooling the prefired mixture, finely-dividing the prefired mixture, compressing the finely-divided prefired mixture into a body of desired shape and dimensions and finally sintering the so formed body to produce the ferrite.

Other compounds of the metals, for example, the carbonates and the oxalates of the metals which may be converted into the corresponding metal oxides at the prefiring temperature may be substituted for the metal oxides. As the iron-supplying constituent of the starting mixture ferric oxide ($Fe_2O_3$), is usually used but also other iron compounds, for example, $FeSO_4 \cdot 7H_2O$ and $Fe(NO_3)_3 9H_2O$ (see, for example, British patent specification No. 739,069) have been used in this connection.

Hydrated ferrous-sulfate, i.e. ferrous-sulfate-heptahydrate ($FeSO_4 \cdot 7H_2O$) and ferrous-sulfate monohydromate ($FeSO_4 \cdot H_2O$) are available in large quantities as waste products of steel manufacture and are consequently very inexpensive in spite of the fact that they contain only approximately 0.1% by weight of impurities. Naturally, they may first be processed to ferric oxide ($Fe_2O_3$) and this oxide may be normally used as the iron-supplying constituent of the starting material during prefiring. However, this method is a round about way. Alternatively, when causing the ferrous-sulfate to react directly with the remaining-ferrite-forming metal compounds, as described in the above British patent specification No. 739,069, the drawback has so far always been experienced, that, in order to obtain a sulfur-free reaction product, heating had to be carried out for a prolonged period of time.

The invention relates to a method which makes it possible to convert the starting material—crystal water-containing ferrous-sulfate—by direct recation of the ferrous-sulfate with the other ferrite-forming metal compound(s) in a rapid and efficient manner with a minimum of heat consumption and processing cost into a prefired material which forms an excellent starting substance for the manufacture of ferromagnetic ferrite bodies, which meet high quality requirements. In this method, the ferrous-sulfate, and the other metal compound(s) required for the formation of the ferrite, are stirred at a temperature between 30° C. and 80° C. to form a granular mass which is dried by heating and then heated in a fluid bed furnace.

If desired, the crystal mass of ferrous-sulfate and the other metal compound(s) required for the formation of the desired ferrite, including possibly one or more other iron compounds, for example ferric oxide ($Fe_2O_3$), may be combined before starting stirring. Alternatively, only the crystal mass of the ferrous-sulfate may be stirred first in the mixer and, if desired, heated and then the other metal compound(s) required for the formation of the ferrite may be added. At approximately 30° C. the ferrous-sulfate-heptahydrate starts releasing part of its crystal water. As a result of this, a granular mass is formed in the mixer after stirring for some time. If desired, a little water is added during stirring, but usually this is not necessary. If ferrous-sulfate monohydrate is used as the starting material, the addition of additional water is essential for the formation of the above-mentioned granular mass. By stirring intensively, it is possible, as a result of the heat produced in the mixer by the friction, to raise the temperature of the contents of the mixer sufficiently so that an additional supply of heat may be omitted. The granulation in the mixer usually occurs within a period of time of from approximately 20 to 30 minutes at temperatures between 50° C. and 60° C. At temperatures between 30° C. and 50° C., granulation usually requires more time, while with temperatures exceeding 60° C., greater adherence of the contents of the mixer to the wall of the apparatus will result, especially as the temperature increases, for which reason the use of temperatures above 80° C. is not preferred.

The thus-formed granulate is then dried by heating. In order to prevent the grains from agglomerating, the granulate may be kept in constant motion during drying, for example, by heating it on a vibrating metal plate.

The dried granulate is then transferred to a furnace of the "fluid bed type." Furnaces of this type are known per se. By means of a vigorous flow of gas, the granulate in this furnace is brought into the condition of a fluidized system (i.e. an undulating layer of small particles having the appearance of a vehemently boiling liquid mass) and heated in this condition to a temperature above 500° C. The prefiring is carried out, in a short period of time, usually approximately 5 to 10 minutes. The prefired material is then removed from the furnace and cooled.

Since, in general, on firing the sulfate-containing granulate sulphur dioxide ($SO_2$) is formed in addition to sulphur-trioxide ($SO_3$) and since the removal of the sulphurtrioxide usually presents difficulties, it is preferred that a solid finely-divided reducing agent be included in the starting mixture for preparing the granulate. A reducing agent which is very suitable for this purpose is finely-divided carbon (carbon dust). Flowers of sulphur also may be used for the same purpose. In some cases, for example, in the preparation of prefired material for manufacturing permanent magnetic bodies composed of $BaO \cdot 6Fe_2O_3$ and/or $SrO \cdot 6Fe_2O_3$ and/or $PbO \cdot 6Fe_2O_3$, barium sulfate and/or strontium sulfate and/or lead sulfate being formed in the fluid bed furnace—substances which do not decompose at the temperatures prevailing in the furnace—it is even necessary to use a reducing agent. These sulfates are then reduced to sulphides which in turn may be converted again into oxides by supplying the fluidized system with overheated water vapor, which oxides then react with the other reaction components in the fluid bed furnace, while forming the desired prefired material.

If, as stated above, a reducing agent is used, undesired formation of compounds of bivalent iron, for example, ferrosoferric oxide ($Fe_3O_4$) may occur during the firing of the granulate in the fluid bed furnace. In order to avoid this, the oxygen content of the gas supplied to the furnace may be adjusted so that these compounds of bivalent iron are oxidized again wholly, or if desired, partially, to the corresponding compounds of trivalent iron.

In this connection, it is noted, that, preferably, a system of supply pipes for different gases (for example air, oxygen, nitrogen and water vapor) be connected to the fluid bed furnace, which renders it possible to adapt the composition of the gas supplied to the furnace which maintains the fluidized system to a considerable extent to the requirements which are imposed upon the prefired material to be produced. Consequently, in this case, also the composition of the gas supplied to the furnace may be varied, if desired, during heating. A type of fluid bed furnace which is excellently suited for this purpose is described in Belgian patent specification No. 626,925.

The invention will be described in connection with the following specific examples which are illustrative of the invention.

Example I 1500 gm. of ferrous-sulfate-heptahydrate

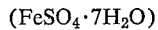

and 4200 gm. of powdered charcoal were mixed together in a heated mixer for two minutes while stirring vigorously. Then 83.55 gm. of strontium carbonate ($SrCO_3$) were added. After approximately 20 minutes, a loose granulate had formed while stirring continuously and heating to approximately 55° C. This granulate was removed from the mixer, after which the particles having a diameter exceeding 1 mm. were sifted out. The granulate from which the coarsest particles had been removed in this manner, was then dried on a metal plate which was heated to approximately 250° C. and kept in a vibrating motion.

Then the dried granulate was heated to 800° C. in a fluid bed furnace which was supplied with nitrogen. The temperature in the furnace was then further increased to 1100° C. in a mixture of nitrogen and water vapor. Then the latter gas mixture was replaced by air, as a result of which the temperature in the furnace increased to 1200° C. After the furnace temperature had decreased again to 1100° C., the prefired material was removed from the furnace and cooled. This material was used for the manufacture of permanent magnetic ferrite bodies in the conventional manner.

Example II

A mixture of 1161 gm. of ferrous-sulfate-heptahydrate, and 12 gm. of powdered charcoal was vigorously stirred in a mixer for approximately 2 minutes. Then, with continued vigorous stirring, a previously prepared mixture of 105.5 gm. of manganese dioxide ($MnO_2$) and 59.25 gm. of zinc oxide (ZnO) was added. During stirring the temperature of the mass in the mixer increased to 35° C. After approximately 40 minutes stirring a loose granulate had formed. This granulate was removed from the mixer, after which the particles having a diameter exceeding 1.2 mm. were sieved out. The granulate from which the coarsest particles were removed in this manner, was then dried on a metal plate which was heated to approximately 250° C. and kept in a vibrating motion.

The dried granulate was then heated to 900° C. in a fluid bed furnace supplied with nitrogen. At this temperature, the nitrogen was replaced by air, as a result of which the furnace temperature increased to 1000 to 1050° C., which temperature was maintained for approximately 5 minutes. Then, the pre-fired material was removed from the furnace and cooled. This material was used for the manufacture of manganese zinc ferrous-ferrite bodies made in a conventional manner.

Example III

A mixture of 1143 gm. of ferrous-sulfate-heptahydrate, and 12 gm. of powdered charcoal was stirred in a heated mixer for approximately 2 minutes. Then, with continued stirring and heating, a previously prepared mixture of 5.35 gm. of manganese carbonate ($MnCO_3$), 91.80 gm. of nickel oxide (NiO), 67.80 gm. of zinc oxide (ZnO), 2.92 gm. of cupric carbonate ($CuCO_3$) and 7.20 gm. of cobaltous-cobaltic oxide ($Co_3O_4$) was added. The temperature of the mass in the mixer was allowed to increase to approximately 55° C. After stirring for approximately 20 minutes, a loose granulate had formed. This granulate was removed from the mixer after which the particles having a diameter exceeding 1.2 mm. were sieved out. The granulate from which the coarsest particles had been removed in this manner, was then dried on a metal plate which was heated to approximately 250° C. and kept in a vibrating motion.

The dried granulate was then heated to 880° C. in a fluid bed furnace supplied with nitrogen. Then, the nitrogen was replaced by air, as a result of which the temperature in the furnace increased to 900° C. This temperature was maintained for five minutes. Then, the pre-fired material was removed from the furnace and cooled. This material was used for the manufacture of soft magnetic ferrite bodies prepared in the conventional manner.

Example IV

A mixture of 1080 gm. of ferrous-sulfate-heptahydrate and 18 gm. of powdered charcoal was stirred in a heated mixer for approximately 2 minutes. Then, with continued stirring and heating, a previously prepared mixture of 133.2 gm. of manganese carbonate ($MnCO_3$) and 54.3 gm. of zinc oxide (ZnO) was added. The temperature of the mass in the mixer rose to approximately 55° C. After approximately 20 minutes, a loose granulate had formed. This granulate was removed from the mixer, after which particles having a diameter exceeding 1.2 mm. were sieved out. The granulate from which the coarsest particles were removed in this manner was then dried on a metal plate which was heated to approximately 250° C. and kept in a vibrating motion.

The dried granulate was then heated to a temperature of approximately 675° C. in a fluid bed furnace supplied with nitrogen. At this temperature, the nitrogen was replaced by air, after which the temperature in the furnace was increased to approximately 980° C. This temperature was maintained for 10 minutes. Then, the pre-fired material was removed from the furnace and cooled. This material was used for the manufacture of manganese zinc-ferrous ferrite bodies prepared in a conventional manner.

Example V

A mixture of 970 gm. of ferrous-sulfate monohydrate, 152 gm. of manganese dioxide ($MnO_2$), 78 gm. of zinc oxide (ZnO), and 18 gm. of charcoal was mixed in a heated mixer for two minutes. With continued stirring 200 cm. of water were added. The temperature increased to 65° C. After approximately 20 minutes, a loose granulate had formed. This granulate was removed from the mixer, after which the particles exceeding 1.2 mm. were sieved out. The granulate from which the coarsest particles had been removed in this manner, was dried on a metal plate in a drying furnace at approximately 200° C.

Then the dried granulate was heated to 900° C. in a fluid bed furnace, which was supplied with nitrogen. At this temperature the nitrogen was replaced by air, after which the temperature in the furnace increased to 1050° C., which temperature was maintained for another five minutes. Then the pre-fired material was removed from the furnace and cooled. This material was used for the manufacture of manganese zinc ferrous ferrite bodies made in a conventional manner.

Example VI

A mixture of 466 gm. of ferrous-sulfate monohydrate, 750 gm. of ferrous-sulfate-heptahydrate, 99.3 gm. of strontium sulfate ($SrSO_4$), and 36 gm. of powdered charcoal powder, was mixed in a heated mixer. During mixing the temperature increased to 65° C. After approximately 30 minutes, a loose granulate had formed. This granulate was removed from the mixer, after which the particles exceeding 1.2 mm. were sieved out. The granulate from which the coarsest particles had been removed in this manner, was then dried on a metal plate in a store at approximately 200° C.

The dried granulate was then heated to 800° C. in a fluid bed furnace which was supplied with nitrogen. Then the temperature in the furnace was further increased to 1100° C., while the furnace was supplied with a mixture of nitrogen and water vapor. Then the latter gas mixture was replaced by air, after which the temperature in the furnace increased to 1200° C. After the temperature of the furnace had decreased again to 1100° C., the pre-fired material was removed from the furnace and cooled. This material was used for the manufacture of permanent magnetic ferrite bodies prepared in a conventional manner.

While the invention has been described in connection with the foregoing illustrative examples, those skilled in this art will appreciate that the invention is not limited thereto but that other starting constituents may be used. Therefore, the invention is not limited to these examples but is defined by the appended claims.

What is claimed is:

1. In the method of manufacturing a ferrite in which ferrous sulfate and a ferrite-forming constituent are heated in a fluid-bed furnace at a temperature exceeding 500° C. for about 5 to 10 minutes to form the ferrite, the steps of stirring a ferrous sulfate hydrate and the ferrite forming constituent at a temperature between about 30° and 80° C. to form a mass of granules, and vibrating the mass of granules while heating the same to a temperature of about 250° C. whereby the granules are dried without being melted, said steps being taken prior to introducing said ferrous sulfate and a ferrite-forming constituent into the fluid bed furnace.

2. A method as defined in claim 1 in which water is added to the ferrous sulfate hydrate during stirring thereof.

3. A method as defined in claim 1 in which a reducing agent is added to the ferrous sulfate hydrate.

4. A method as defined in claim 3 in which the reducing agent is carbon.

5. A method as defined in claim 3 in which the reducing agent is flowers of sulfur.

6. A method as defined in claim 3 in which the ferrite forming constituent is an oxide selected from the group consisting of MnO, ZnO, NiO, and CuO.

7. A method as defined in claim 3 in which the ferrite-forming constituent is an oxide selected from the group consisting of BaO, SrO, and PbO.

References Cited

UNITED STATES PATENTS

| | | |
|---|---|---|
| 2,469,989 | 5/1949 | Pyzel. |
| 2,596,954 | 5/1952 | Heath. |
| 2,642,339 | 6/1953 | Sawyer. |
| 3,113,927 | 12/1963 | Cochardt _____ 252—62.63 |

FOREIGN PATENTS

| | | |
|---|---|---|
| 644,639 | 10/1950 | Great Britain. |
| 739,069 | 10/1955 | Great Britain. |

TOBIAS E. LEVOW, *Primary Examiner.*

ROBERT D. EDMONDS, *Assistant Examiner.*

U.S. Cl. X.R.

252—62.56, 62.6, 62.62, 62.63